United States Patent [19]

Yamamoto et al.

[11] Patent Number: 5,048,223
[45] Date of Patent: Sep. 17, 1991

[54] FISHING ROD

[75] Inventors: Shigeru Yamamoto; Masaru Akiba, both of Tokyo, Japan

[73] Assignee: Daiwa Seiko, Inc., Tokyo, Japan

[21] Appl. No.: 595,775

[22] Filed: Oct. 12, 1990

Related U.S. Application Data

[63] Continuation of Ser. No. 463,861, Jan. 5, 1990, abandoned, which is a continuation of Ser. No. 264,086, Oct. 28, 1988, abandoned.

[30] Foreign Application Priority Data

Oct. 31, 1987 [JP] Japan .............................. 62-167195
Sep. 22, 1988 [JP] Japan .............................. 63-124978
Oct. 17, 1988 [JP] Japan .............................. 63-135158

[51] Int. Cl.$^5$ ............................................. A01K 87/06
[52] U.S. Cl. ............................................. 43/22; 43/23
[58] Field of Search ...................................... 43/22, 23

[56] References Cited

U.S. PATENT DOCUMENTS

| | | | |
|---|---|---|---|
| 3,296,732 | 1/1967 | Magnus | 43/22 |
| 3,522,674 | 8/1970 | Hardesty | 43/22 |
| 3,616,563 | 11/1971 | Catignani | 43/22 |
| 3,883,978 | 5/1975 | Ohmura | 43/22 |
| 3,973,348 | 8/1976 | Shell | 43/23 |
| 4,222,192 | 9/1980 | Jacobson | 43/23 |
| 4,453,332 | 6/1984 | Wightman | 43/23 |
| 4,494,333 | 1/1985 | Jacobson | 43/23 |
| 4,646,462 | 3/1987 | Ohmura | 43/23 |
| 4,653,217 | 3/1987 | Ohmura | 43/22 |
| 4,696,123 | 9/1987 | Bailey | 43/22 |
| 4,697,377 | 10/1986 | Martin | 43/23 |
| 4,771,566 | 9/1988 | Ohmura | 43/23 |
| 4,848,022 | 7/1989 | Ozeki | 43/22 |

Primary Examiner—Kurt Rowan
Attorney, Agent, or Firm—Kalish & Gilster

[57] ABSTRACT

A fishing rod has a reel mounting member and grip members secured to an outer periphery of a rod stem member. One end of the grip member is extended to the portion opposite to the reel leg fixing portion in the vicinity of the reel mounting member, so that the stepped portions between the grip members and the reel mounting member are eliminated. As a result, the configuration thereof can be well adapted to the hand, and the ruggedness does not concentrate on the portion. Such a structure does not cause pains in the palm and fingers of the fisher when enjoying the fishing, and enables the fisher to grasp the fishing rod for a long period of time. Where the exfoliative stresses are applied on the bonding surfaces between the reel mounting member and the grip members when the rod stem member is bent, the joint portion is greater in length than in the prior art, and hence the stresses are dispersed at that portion. In addition, because the wider bonding area is provided, the separation does not occur easily. The appearance is also not spoiled in terms of design.

5 Claims, 5 Drawing Sheets

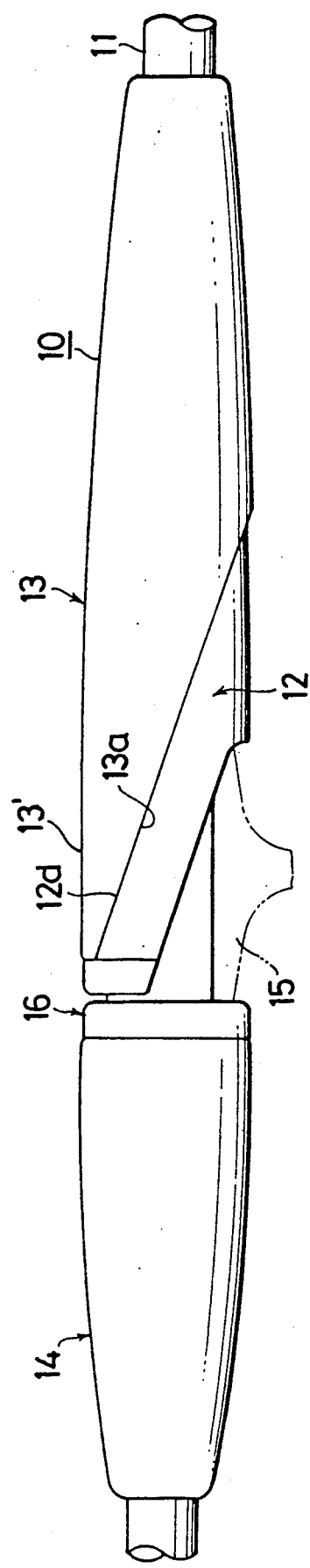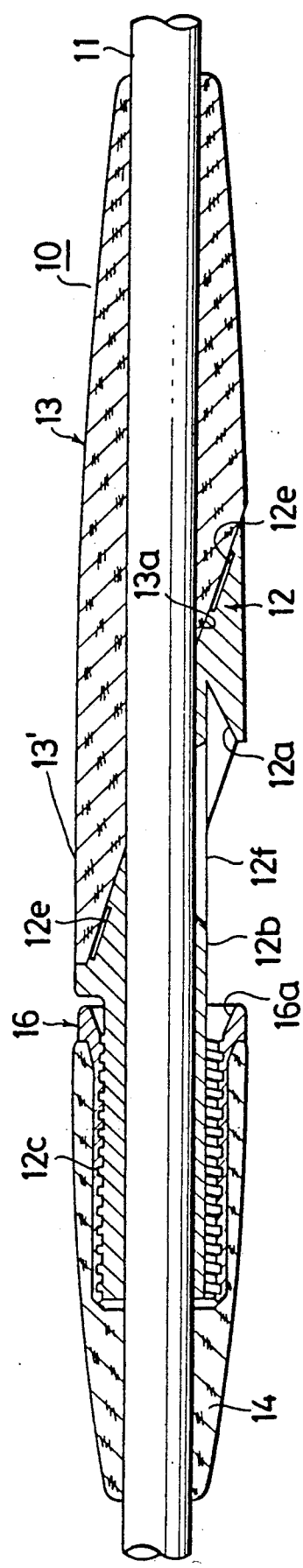

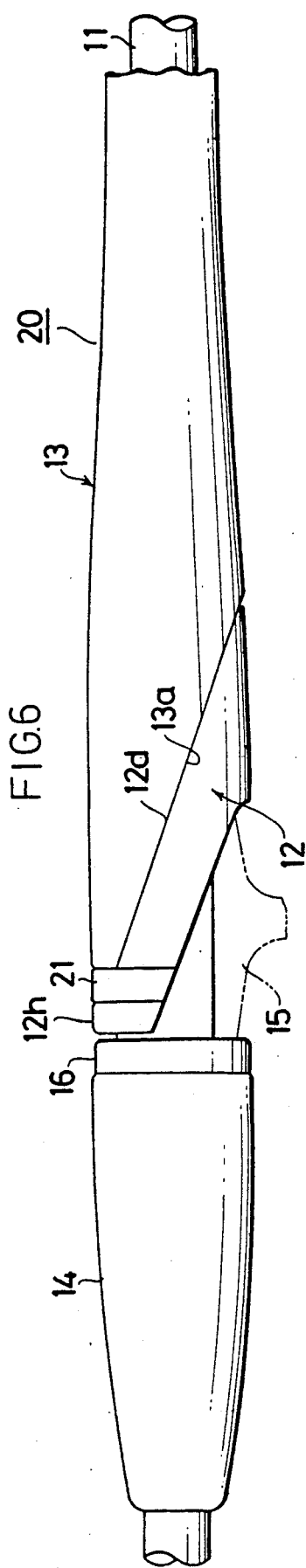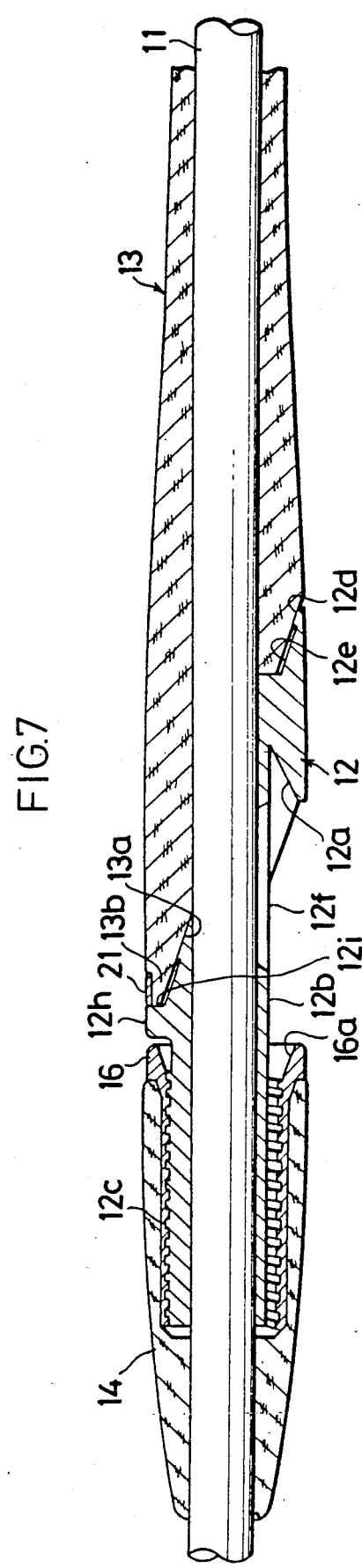

5,048,223

FISHING ROD

CROSS-REFERENCE TO RELATED APPLICATION

This application is a continuation of Ser. No. 07/463,861 now abandoned which is a continuation of Ser. No. 07/264,086, filed Oct. 28, 1988, now abandoned.

BACKGROUND OF THE INVENTION

The present invention relates to an improvement of a fishing rod of the type having a reel mounting member and grip members secured to an outer periphery of a rod stem member.

In a relatively slender fishing rod, as disclosed in, e.g., Japanese Utility Model Laid-Open Publication No.60677/1986, the reel mounting member and the grip member are secured to the outer periphery of a rod stem member to facilitate the gripping and holding of the fishing rod with hands.

This type of fishing rod will now be described with reference to FIG. 10. Fixed to the outer periphery of a relatively slender rod stem member 2 is a reel mounting member 3 for fastening a reel leg 6. Large-diameter grip members 4 and 5 for facilitating the gripping and holding of a fishing rod 1 with hands are fixedly provided in front and in rear of the reel mounting member 3.

In this fishing rod 1, the reel leg 6 of the reel (not illustrated) is fixedly mounted on the reel mounting member 3; the angling can be effected while grasping the large-diameter grip members 4 and 5.

This type of conventional fishing rod 1 is, however, constructed in such a way that end surfaces 3a and 3b of the reel mounting member 3 and end surfaces 4a and 5a of the grip members 4 and 5 respectively contiguous to the end surfaces 3a and 3b are formed on planes orthogonal to the rod stem member 2. Hence, this arrangement does not provide a large bonding area and sufficient bonding effects. If a big fish is jigged, the rod stem member 2 positioned in front and in rear of the reel mounting member 3 is bent, resulting in a defect of causing exfoliation of the bonding surfaces between the reel mounting member 3 and the grip members 4 and 5.

The thus separated bonding surfaces between the reel mounting member 3 and the grip members 4 and 5 causes further expansion of exfoliation. This produces defects of bringing about some breakages and damages, which spoil the appearance in terms of design.

Besides, stepped portions are formed between the reel mounting member 3 and the grip members 4 and 5 in the conventional fishing rod 1, and hence, as illustrated in FIG. 10, the fisher grasps the fishing rod 1 with a hand H in such a way that: the reel leg 6 fixed to the reel mounting member 3 is seized by a middle finger Hc and a third finger Hd; a forefinger Hb and a little finger He are placed on the front and rear grip members 4 and 5, while a thumb Ha is put on the front grip member 4; and from the grip member 5 a palm Hf is set in contact with a portion 3c opposite to the reel leg 6 of the reel mounting member 3. The fishing rod is thus manipulated.

In the case of grasping the fishing rod 1 for a long stretch of time in a state depicted in FIG. 10, some pains are felt in the middle finger Hc, the third finger Hd and also the palm Hf placed from the grip member 5 on the portion 3c opposite to the reel leg 6 of the reel mounting member 3. If intense, this brings about not only an obstacle to the fishing but also damages to the palm Hf, the middle finger Hc and the third finger Hd.

SUMMARY OF THE INVENTION

It is a primary object of the present invention which obviates the foregoing problems inherent in the prior art to provide an easy-to-grasp fishing rod capable of preventing exfoliation of bonding surfaces and breakages by such an arrangement that: an end of a grip member is extended to a portion opposite to a reel leg fixing portion of a reel mounting member in order to expand the bonding surfaces between the reel mounting member and grip members; concentration of stresses due to bending of a rod stem member is slackened; and the stresses applied on the above-mentioned engaging surfaces are dispersed.

To this end, according to one aspect of the invention, there is provided a fishing rod comprising: a rod stem member; a reel mounting member fixedly bonded to an outer periphery of the rod stem member; and grip members likewise bonded to the outer periphery thereof, wherein one end of a grip mounting member is extended to a portion opposite to a reel leg fixing portion in the vicinity of the reel mounting member.

According to another aspect of the invention, there is provided a fishing rod comprising: a rod stem member; a reel mounting member fixedly bonded to an outer periphery of the rod stem member; and grip members likewise bonded to the outer periphery thereof, wherein one end of a grip mounting member is extended to a portion opposite to a reel leg fixing portion in the vicinity of the reel mounting member, and wherein one ends of the grip members and one end of the reel mounting member, which are set in contact with each other, are formed to have inclinations to the other ends of the grip members.

According to still another aspect of the invention, there is provided a fishing rod comprising: a rod stem member; a reel mounting member fixedly bonded to an outer periphery of the rod stem member; grip members likewise bonded to the outer periphery thereof, wherein one end of a grip mounting member is extended to a portion opposite to a reel leg fixing portion in close proximity to the reel mounting member, and wherein one end of the reel mounting member and one ends of the grip members, which are set in contact with each other, are formed to assume stepped configurations toward the other ends of the grip members.

According to a further aspect of the invention, there is provided a fishing rod comprising: a rod stem member; a reel mounting member fixedly bonded to an outer periphery of the rod stem member; and grip members likewise bonded to the outer periphery thereof, wherein one end of a grip mounting member is extended to a portion opposite to a reel leg fixing portion in the vicinity of the reel mounting member, wherein one end of the reel mounting member and one ends of the grip members, which are set in contact with each other, are formed to have inclinations to the other ends of the grip members, and wherein one end of the grip mounting member is provided with a cover member.

According to still a further aspect of the invention, there is provided a fishing rod comprising: a rod stem member; a reel mounting member fixedly bonded to an outer periphery of the rod stem member, and grip members likewise bonded to the outer periphery thereof, wherein one end of a grip mounting member is extended to a portion opposite to a reel leg fixing portion in the vicinity of the reel mounting member, wherein one end of the reel mounting member and one ends of the grip members, which are set in contact with each other, are formed to assume stepped configurations toward the other ends of the grip members, and wherein one end of the grip mounting member is provided with a cover member.

The fishing rod according to the present invention includes the cover member constituted by one end of the reel mounting member.

In the fishing rod according to the present invention, one end of the grip mounting member is extended to the portion opposite to the reel leg fixing portion in the vicinity of the reel mounting member, and hence the stepped portions conventionally formed between the reel mounting member and the grip members can be eliminated. When the fisher grasps the reel leg, the extended grip members are held by the palm as well as by respective fingers. This arrangement permits the continuance of grasping for a long period of time without causing any pain in the palm and the fingers as well.

In the fishing rod according to the present invention, one end of the grip mounting member is extended to the portion opposite to the reel leg fixing portion in the vicinity of the reel mounting member. In this configuration, when catching a fish big enough to bend the rod stem member, the exfoliative stresses act on bonding surfaces between the rod stem member and the reel mounting member, between the rod stem member and the grip members and further between the reel mounting member and the grip members. The exfoliative stresses are, however, dispersed on the expanded bonding surfaces between the reel mounting member and the grip members, and the concentration of stresses due to the bending of the rod stem member is also relaxed, thus preventing the separation of the bonding surfaces and breakages thereof.

Furthermore, in the fishing rod according to the present invention, since one end of the grip mounting member is provided with the cover member, when the rod stem member is bent, and when the separation of the end surfaces of the grip members is going to take place, such an action is hindered by the cover member from outside. The exfoliation is thus prevented.

Moreover, in the fishing rod according to the present invention, spacings formed in the bonding surfaces between the reel mounting member and the grip members are so covered with the cover member as not to be exposed.

Other objects and advantages of the invention will become more apparent during the following discussion with reference to the accompanying drawings.

BRIEF DESCRIPTION OF THE DRAWINGS

FIG. 1 is a side view illustrating the principal portion of a fishing rod in a first embodiment of the present invention;

FIG. 2 is a sectional side view of the fishing rod in the first embodiment of the present invention;

FIG. 6 is a side view illustrating the principal portion in a second embodiment of the present invention;

FIG. 7 is a sectional side view illustrating the fishing rod in the second embodiment of the present invention;

DESCRIPTION OF THE PREFERRED EMBODIMENTS

Figure 3:
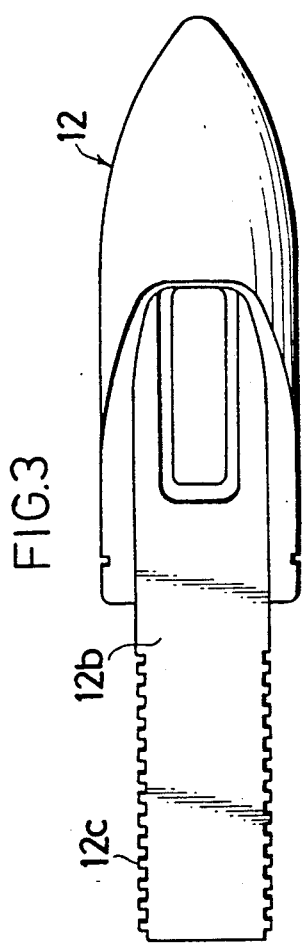
FIG. 3 is a plan view depicting a reel mounting member of FIG. 1.
Figure 4:
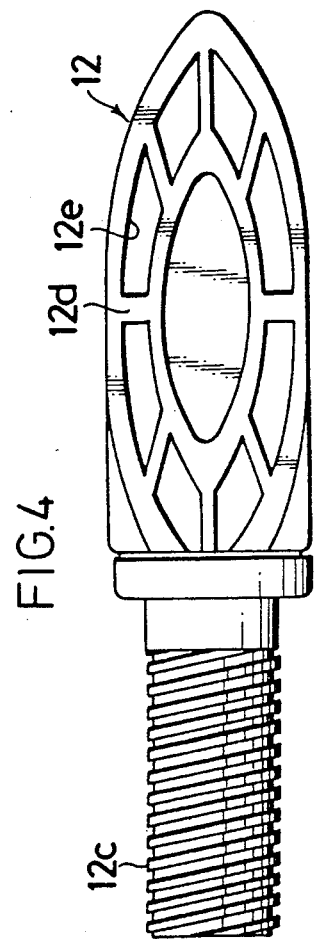
FIG. 4 is a rear view showing the reel mounting member of FIG. 1.

FIGS. 1 to 4 each show a fishing rod in a first embodiment of the present invention. The reference numeral 10 designates a fishing rod.

The fishing rod is arranged in the following manner. Secured to an outer periphery of a rod stem member are a reel mounting member 12 and first and second grip members 13 and 14. The first grip member 13 abuts on the rear portion of the reel mounting member 12, while the second grip member 14 abuts on the front portion thereof, in which state these components are fixedly bonded to each other.

The hollow cylindrical reel mounting member 12 is formed of synthetic resin. The reel mounting member 12 is composed of: a cavity 12a in which a reel leg 15 such as a spinning reel or the like is inserted; a planar reel mounting portion 12b; an external thread 12c; an oblique surface 12d integrally so formed on the rear opposite side to the reel mounting portion 12b as to incline with respect to the axial line thereof; a recess 12e, formed in the oblique surface 12d, for accomodating a bonding agent; and a through-hole 12f perforated in front of the cavity 12a formed behind the reel mounting portion 12b. A thin nut 16, one end of which is formed with an expanded portion 16a having inserted therein a reel leg fixing portion 15, is spirally fitted to the external thread 12c.

The second grip member 14 is fixedly bonded to an outer periphery of the nut 16.

The first grip member 13 assuming a hollow cylindrical configuration is formed of cork, dura cork or foaming resin. The first grip member 13 is formed with an oblique surface 13a connected to the oblique surface 12d of the reel mounting member 12.

The second grip member 14 taking the hollow cylindrical shape is formed similarly of the cork, the dura cork or the foaming resin.

In the thus constructed fishing rod 10, one end of the first grip member 13 nearest the second grip member 14 is extended to a portion 13' opposite to a reel leg fixing portion 15 in the vicinity of the reel mounting member 12. Hence, a stepped portion between the first grip member 13 and the reel mounting member 12 is eliminated. This arrangement enables the fisher to grasp the reel leg fixing portion 15 for a long time without causing pains in the palm as well as in the individual fingers, because the first extended grip member 13 is held by the palm and fingers.

The fishing rod 10 is characterized by the arrangement that when the rod stem member 11 is bent by a big fish jigged, especially because the reel mounting member 12 includes the oblique surface 12d formed on the rear side thereof, the stresses do not concentrate but are dispersed between the rod stem member and itself. Besides, the oblique surfaces 12d and 13a of the reel mounting member 12 and of the first grip member 13 are fixedly bonded to each other, and a bonding area between the oblique surfaces 12d and 13a is larger than in the prior art, whereby the exfoliative stresses do not concentrate. The stresses are dispersed along the oblique surfaces 12d and 13a, and it follows that the separation can not easily be effected.

In accordance with the above-described embodiment, the bonding area of the oblique surface 12d of the reel mounting member 12 is formed wider than that in the prior art, so that the recess 12e in which the bonding agent is accumulated may be omitted.

Figure 5:
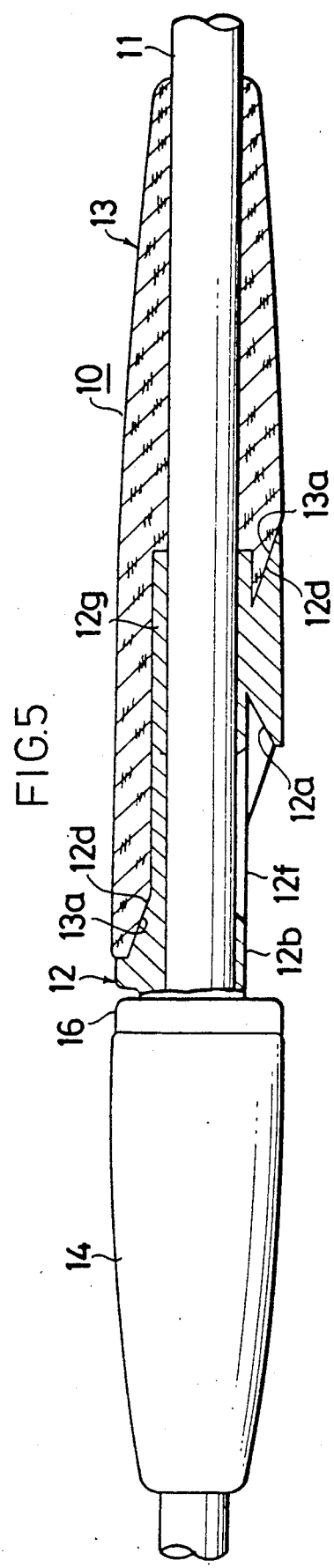
FIG. 5 is a sectional side view of the fishing rod, showing a variant form of the reel mounting member depicted in FIG. 1.

Turning attention to FIG. 5, there is illustrated a variant form of the first embodiment, wherein a hollow cylinder 12g is integrally formed at the center of the reel mounting member 12.

This embodiment also exhibits the same function and effects as those in the previous embodiment.

FIGS. 6 and 7 each show a fishing rod 20 in a second embodiment of the present invention.

The fishing rod 20 has the same construction as that of the fishing rod except that an end surface 13b of the first grip member 13 on the side of the reel mounting member 12 is provided with a cover member 21.

In accordance with the second embodiment, the end surface 13b of the first grip member 13 on the side of the reel mounting member 12 impinges on an end portion 12i of a portion 12h opposite to the reel mounting portion 12b of the reel mounting member 12 on the side of the first grip member 13. The end surface 13b tends to separate therefrom when the rod stem member 11 is sharply bent. In addition, when the oblique surface 12d of the reel mounting member 12 is brought into contact with the oblique surface 13a of the first grip member 13, there is formed a spacing between the end surface 12i of the portion 12h opposite to the reel mounting portion 12b of the reel mounting member 12 on the side of the first grip member 13 and the end surface 13b of the first grip member 13 on the side of the reel mounting member 12. Hence, the cover member 21 is provided at that portion.

In accordance with the thus arranged second embodiment, if a big fish is jigged or something happens to largely deform the fishing rod 20, a resultant force acts to separate the end surface 13b of the first grip member 13 on the side of the reel mounting member 12 from the portion 12h opposite to the reel mounting portion 12b of the reel mounting member 12. In this case, the cover member 21 provided above the end surface 13b functions to hinder such an action, thus preventing the separation therefrom.

The second embodiment also, as a matter of course, provides the same function and effects as those in the first embodiment.

Figure 8:
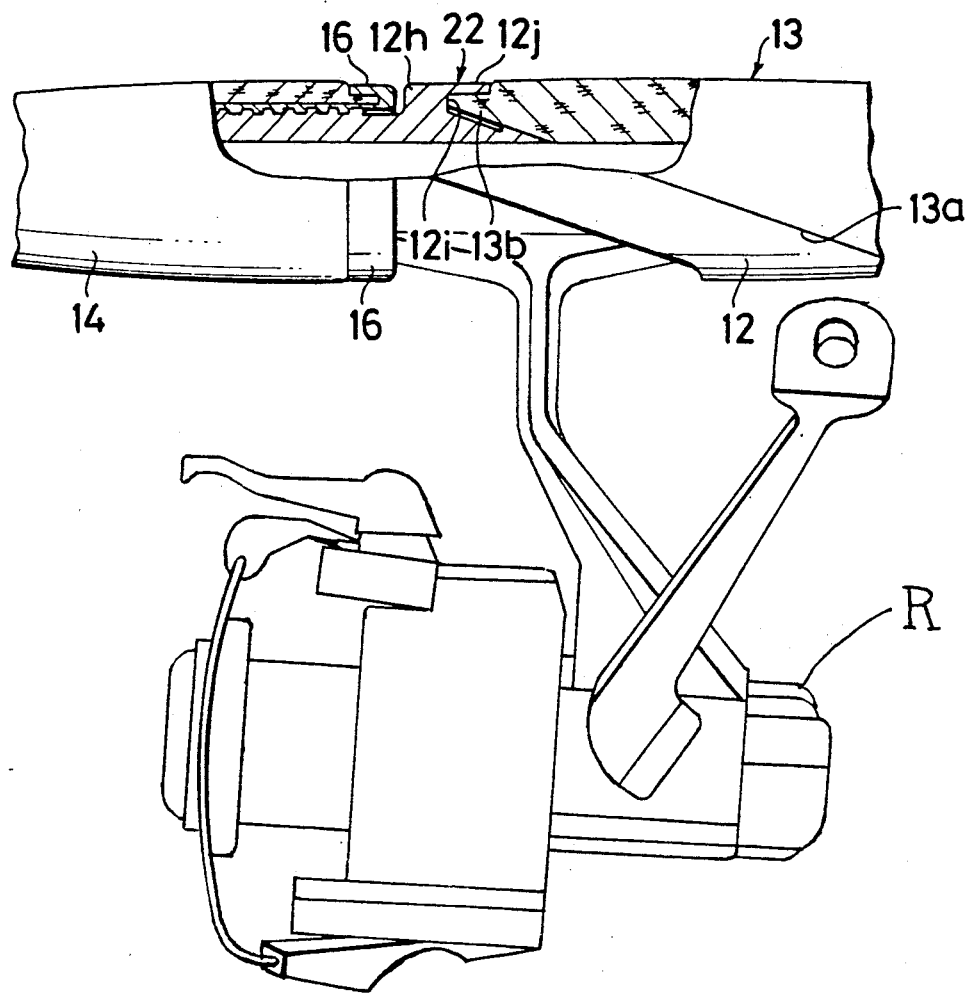
FIG. 8 is a sectional side view of the fishing rod, showing a variant form of the reel mounting member of FIG. 7.

FIG. 8 shows a variant form of the second embodiment, wherein a cover member 22 and the reel mounting member 12 are formed into one united body.

In this example, a protrudent piece 12j protruding toward the first grip member 13 is provided on the portion 12h opposite to the reel mounting portion 12b of the reel mounting member 12. The protrudent piece 12j and the end surface 12i are combined to form the recess. Fitted in this recess is the end surface 13b of the first grip member 13 on the side of the reel mounting member 12.

As in the second embodiment, in this example also, it is possible to prevent the separation of the end surface 13b of the first grip member 13 on the side of the reel mounting member 12.

Figure 9:
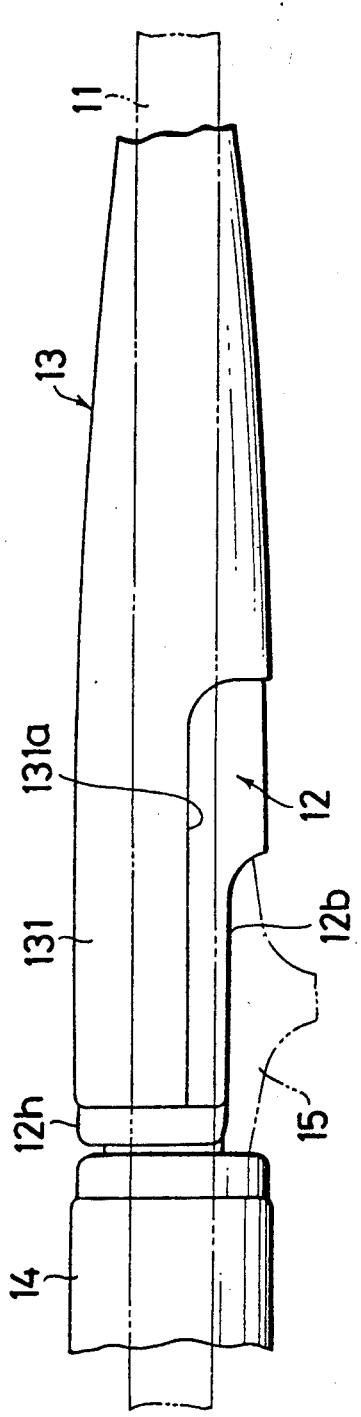
FIG. 9 is a principal side view showing a variant form of the fishing rod in the first embodiment of the present invention.
Figure 10:
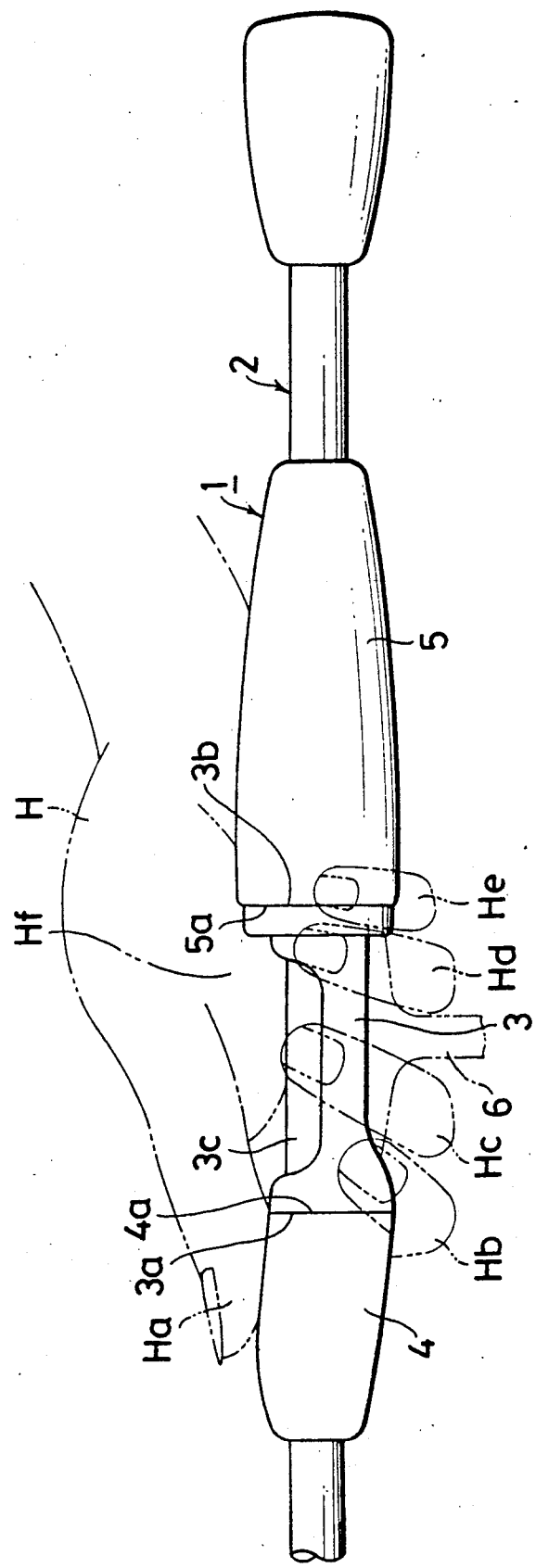
FIG. 10 is a side view of a conventional fishing rod.

FIG. 9 illustrates a variant form of the first embodiment, wherein it is feasible to prevent the separation of an end portion 131 of the first grip member 13 on the side of the second grip member 14 without providing the cover member shown in FIGS. 6 through 8.

In this example, the end portion 131 of the first grip member 13 on the side of the second grip member 14 has a substantially uniform width enough to cover a large proportion of the portion 12h opposite to the reel mounting portion 12b of the reel mounting member 12. An underside 131a of the end portion 131 is formed substantially in parallel with the axial line of the rod stem member 11. The underside 131a of the end portion 131 is also formed to cover the lower portion of the reel mounting member 12 on the rear side of the reel mounting portion 12b.

As discussed above, in this example, the end portion 131 of the first grip member 13 on the end toward the second grip member 14 is capable of covering the great majority of portions except the reel mounting portion 12b of the reel mounting member 12. Consequently, the bonding area between the first grip member 13 and the reel mounting member 12 is remarkably increased; and a bonding portion therebetween on the end toward the second grip member 14 is several times as large as those shown in FIGS. 1 through 5. It is therefore hard to separate from this portion. A bonding area between the first grip member 13 and the reel mounting member 12 is formed which is greater than those shown in FIGS. 1 to 5. Hence, a bonding strength can be improved, thereby making the separation difficult.

In this example, the underside 131a of the end portion 131 of the first grip member 13 on the side of the second grip member 14 is formed substantially in parallel with the axial line of the rod stem member 11. The arrangement is not, however, confined to this. The underside 131a may be formed in a saw-toothed shape.

In the above-described embodiments, there has been shown a case where the reel mounting portion 12b of the reel mounting member 12 is turned downward to mount the reel leg 15 such as a spinning reel or the like. The fishing rod may be arranged such that the reel mounting portion 12b is turned upward to mount a reel fitting plate such as a double-bearing type reel.

The above-described embodiments have dealt with the fishing rods each including the first and second grip members 13 and 14. The present invention may, however, be applied to a fishing rod equipped with a single piece of grip member.

As discussed above, the fishing rods according to the present invention exhibit the following effects. One end of the grip member is extended to the portion opposite to the reel leg fixing portion in the vicinity of (and overlapping) the reel mounting member, so that the stepped portions between the grip members and the reel mounting member may be eliminated. As a result, the configuration thereof can be well adapted to the hand, and the ruggedness does not concentrate on one portion. Such a structure does not cause pains in the palm and fingers of the fisher when enjoying the fishing, and enables the fisher to grasp the fishing rod for a long period of time. Where the exfoliative stresses are applied on the bonding surfaces between the reel mounting member and the grip members when the rod stem member is bent, the joint portion is greater in length than in the prior art, and hence the stresses are dispersed at that portion. In addition, because the wider bonding area is provided, the separation does not occur easily. The appearance is also not spoiled in terms of design.

The fishing rods according to the present invention further provide the following effects in addition to the above-mentioned ones. Namely, the peripheries of the grip members are covered, so that the exfoliation of the end surfaces can be prevented. Spacings which tend to be formed in the bonding surfaces between the reel mounting member and the grip members can be so covered as not to be exposed.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or the spirit of the invention.

What is claimed is:

1. A fishing rod comprising:
a rod stem member subject to bending upon catching of a fish;
a spinning reel mounting member secured to an outer periphery of said rod stem member for engaging to reel leg fixing portion at a lower side of the rod stem member; and
at least two grip members likewise secured to the outer periphery of said rod stem member, one end of a first grip member being bonded to one end of said spinning reel mounting member and forming a bonding surface which extends from behind a spinning reel mounted on a bottom surface of said rod obliquely upwardly and forward towards a rod tip to a position above said spinning reel and adjacent to a second, forwardly positioned grip member, said bonding surfaces being exposed to exfoliative stresses upon bending, said bonding surfaces being oblique relative to the axis of said rod stem member, whereby to disperse the exfoliative stresses without damage upon bending.

2. A fishing rod comprising:
a rod stem member subject to bending upon catching of a fish;
a spinning reel mounting member secured to an outer periphery of said rod stem member for engaging a reel leg fixing portion at a lower side of the rod stem member; and
at least two grip members likewise secured to the outer periphery of said rod stem member, one end of a first grip member being bonded to one end of said spinning reel mounting member and forming a bonding surface which extends from behind a spinning reel mounted on a bottom surface of said rod upwardly and forward towards a rod tip to a position above said spinning reel and adjacent to a second, forwardly positioned grip member, said bonding surface being exposed to exfoliative stresses upon bending, said bonding surface further being stepped to provide increased bonding area including at least one segment which is other than parallel to an axis of said rod stem member, whereby to disperse the exfoliative stresses without damage upon bending.

3. A fishing rod comprising:
a rod stem member subject to bending upon catching of a fish;
a spinning reel mounting member secured to an outer periphery of said rod stem member for engaging a spinning reel leg fixing portion at a lower side of the rod stem member; and
at least two grip members likewise secured to the outer periphery of said rod stem member, one end of a first grip member being bonded to one end of said spinning reel mounting member and forming a bonding surface which extends from behind a spinning reel mounted on a bottom surface of said rod obliquely upwardly and forward towards a rod tip to a position above said spinning reel and adjacent to a second, forwardly positioned grip member, said bonding surface being exposed to exfoliative stresses upon bending, said bonding surface being oblique relative to the axis of said rod stem member, whereby to disperse the exfoliative stresses without damage upon bending, and wherein one end of said first grip member is provided with a cover member.

4. A fishing rod comprising:
a rod stem member subject to bending upon catching of a fish;
a spinning reel mounting member secured to an outer periphery of said rod stem member for engaging a reel leg fixing portion at a lower side of the rod stem member; and
at least two grip members likewise secured to the outer periphery of said rod stem member, one end of a first grip member being bonded to one end of said spinning reel mounting member and forming a bonding surface which extends from behind a spinning reel mounted on a bottom surface of said rod upwardly and forward towards a rod tip to a position above said spinning reel and adjacent to a second forwardly positioned grip member, said bonding surface being exposed to exfoliative stresses upon bending, said bonding surface being stepped to provide increased bonding area including at least one segment which is other than parallel to an axis of said rod stem member, whereby to disperse the exfoliative stresses without damage upon bending, and wherein one end of said first grip member is provided with a cover member.

5. A fishing rod comprising:
a rod stem member subject to bending upon catching of a fish;
a spinning reel mounting member secured to an outer periphery of said rod stem member; and
at least two grip members likewise secured to the outer periphery of said rod stem member, one end of a first grip member being bonded to one end of said spinning reel mounting member and forming a bonding surface which extends from behind a spinning reel mounted on a bottom surface of said rod upwardly and forward towards a rod tip to a position above said spinning reel and adjacent to a second, forwardly positioned grip member, said bonding surface being exposed to exfoliative stresses upon bending, said bonding surface being stepped to provide increased bonding area including at least one segment which is other than parallel to the axis of said rod stem member, whereby to disperse the exfoliative stresses without damage upon bending, one end of said first grip member being provided with a cover member, said cover member being constituted by one end of said spinning reel mounting member.

* * * * *